(12) United States Patent
Ebenhoch

(10) Patent No.: US 6,990,871 B2
(45) Date of Patent: Jan. 31, 2006

(54) SELECTOR TRANSMISSION FOR A MOTOR VEHICLE

(75) Inventor: Michael Ebenhoch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 19 days.

(21) Appl. No.: 10/762,390

(22) Filed: Jan. 22, 2004

(65) Prior Publication Data
US 2004/0149061 A1 Aug. 5, 2004

(30) Foreign Application Priority Data
Jan. 22, 2003 (DE) ................ 103 02 258

(51) Int. Cl.
F16H 21/40 (2006.01)
F16H 21/52 (2006.01)
F16H 27/08 (2006.01)
F16H 29/20 (2006.01)

(52) U.S. Cl. ............... 74/74; 74/331; 74/333; 74/334; 74/335; 74/336 R; 74/664; 74/665 R

(58) Field of Classification Search .......... 74/74, 74/331, 333, 334, 335, 336 R, 664, 665 R
See application file for complete search history.

(56) References Cited

U.S. PATENT DOCUMENTS

| | | | | |
|---|---|---|---|---|
| 4,033,200 A | * | 7/1977 | Stockton ............... | 475/206 |
| 4,377,951 A | | 3/1983 | Magg et al. ............ | 74/477 |
| 4,440,037 A | * | 4/1984 | Foxton et al. .......... | 74/331 |
| 4,461,188 A | * | 7/1984 | Fisher ................... | 74/330 |
| 5,503,039 A | | 4/1996 | Bailly et al. ........... | 74/335 |
| 5,743,141 A | * | 4/1998 | Forsyth ................. | 74/331 |
| 5,906,132 A | * | 5/1999 | Janiszewski .......... | 74/331 |
| 5,927,145 A | * | 7/1999 | Ahluwalia et al. ..... | 74/331 |
| 6,067,870 A | * | 5/2000 | Fleishman et al. ..... | 74/331 |
| 6,318,211 B1 | | 11/2001 | Nitzschke et al. ...... | 74/745 |
| 6,874,381 B2 | * | 4/2005 | Berger et al. .......... | 74/335 |

FOREIGN PATENT DOCUMENTS

DE          30 00 577 A1          7/1981

(Continued)

Primary Examiner—Charles A. Marmor
Assistant Examiner—David D. Le
(74) Attorney, Agent, or Firm—Davis & Bujold, P.L.L.C.

(57) ABSTRACT

A selector transmission for a motor vehicle in which two transmission shift positions G1, G2; G3, G4; G5, G6 situated in a shifting gate 55 of an H or multi-H shifting gate 51 within a transmission 1 can be respectively shifted via two different shifting sets 29, 30, 31, 32. The transmission 1 has one transmission input shaft 5, two countershafts 15, 16, one reverse gear shaft 22 and one transmission output shaft 28 available. The fixed and idler gears of each ratio step are positioned on the transmission shafts so that, departing from a single starting and separating clutch 4 of the transmission, the transmission gears are disposed in a sequence G2 and RG, G4 and G6, G3, G1, G5. Between the gear wheels of the second and of the fourth gear, of the third and first gear and between those of the reverse gear and the sixth gear, the shifting sets 29, 30, 31, 32 are, in addition, located upon the countershafts 15, 16 with which each idler gear can be non-rotatably connected with respectively associated countershafts. Such a transmission is shiftable with a shifting device 50 having H or multi-H shifting gates 51 and comprises one mechanical conversion device which converts a shifting movement from one gear position to the next gear position G1–G2; G3–G4; G5–G6 in one shifting gate 55 into actuation movements for two shifting sets 29, 30, 31, 32 in the transmission 1.

3 Claims, 2 Drawing Sheets

FOREIGN PATENT DOCUMENTS

Figure 1:
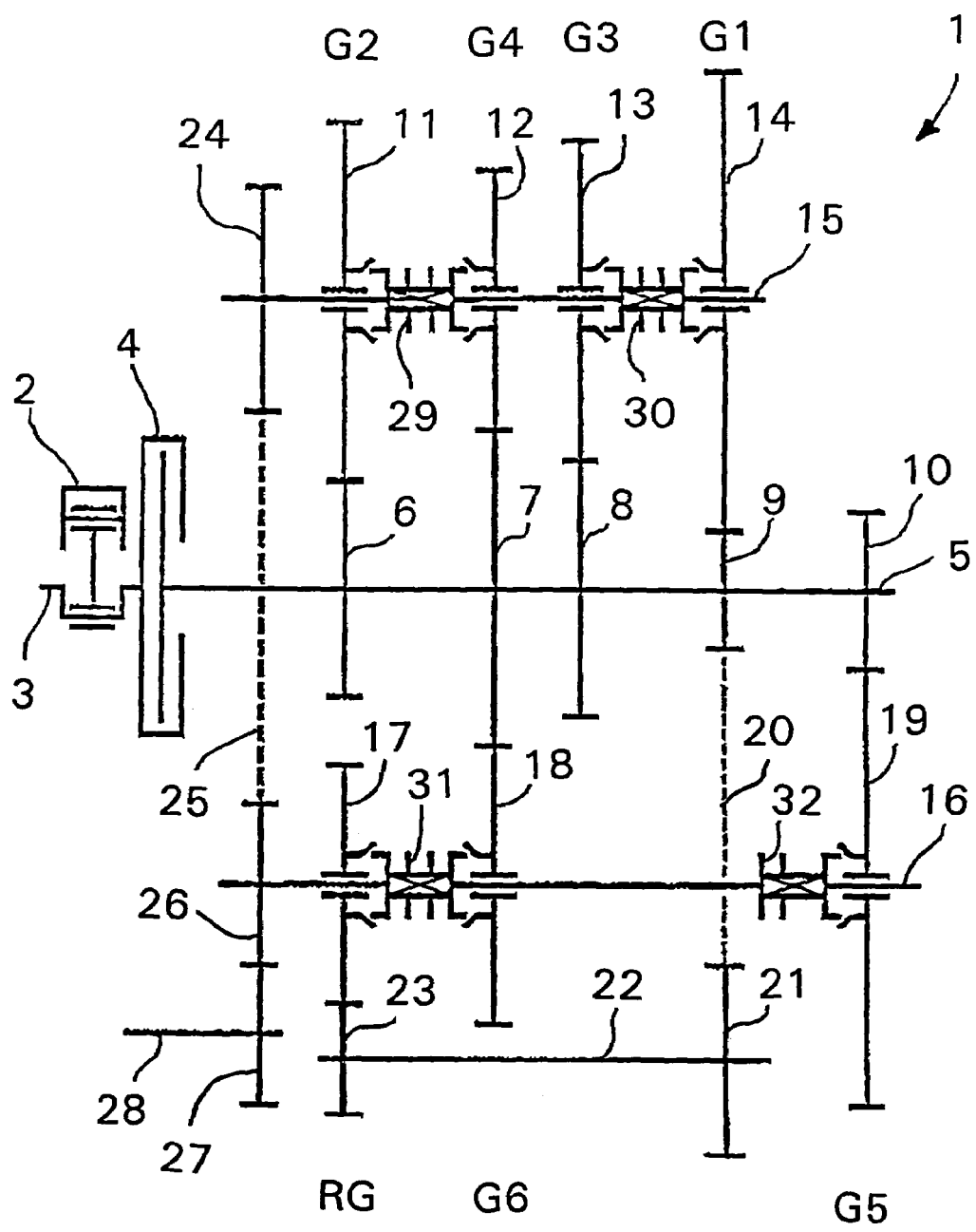

| | | |
|---|---|---|
| DE | 35 27 390 A1 | 2/1987 |
| DE | 41 37 143 A1 | 5/1993 |
| DE | 102 31 547.7 | 7/2002 |
| EP | 1 034 384 B1 | 2/2002 |
| JP | 06074305 A * | 3/1994 |
| WO | WO 184019 A1 * | 11/2001 |

* cited by examiner

SELECTOR TRANSMISSION FOR A MOTOR VEHICLE

The invention concerns a selector transmission for a motor vehicle in which two gears situated in a shifting gate of an H or multi-H transmission shifting gate can be respectively shifted by two different shifting sets in the transmission.

DE 41 37 143 A1 has disclosed a multi-step synchronized countershaft transmission in which two gears are respectively associated with one of several shifting sets. Those shifting sets comprise, as a rule, sliding sleeves axially movably but non-rotatably disposed upon a transmission shaft and which, during a shifting operation in the interaction with synchronizer rings situated on the shaft adjacent to said sliding sleeves, can decelerate idler gear wheels and non-rotatably connect them with the transmission shaft.

In this already known transmission, the two gears (first gear and third gear or second gear and fourth gear) associated with one shifting set are not consecutive transmission gears. This structure is associated with the advantage that thereby a transmission shifting system is provided with which an overlapping operation and thus reduced shifting times are possible. It is a disadvantage that such a transmission cannot be shifted with a shifting device having H shifting gate, since with such an H shifting gate only, immediate consecutive transmission gears can be shifted in the same shifting gate.

From EP 10 34 384 B1 is further known of a twelve-gear selector transmission for industrial vehicles in which a front-mounted splitter group is manually actuated while the main and the rear-mounted range change group and the rear-mounted range change group, pneumatic shifting devices are provided which, while selecting the shifting gate of the desired transmission gear, are correspondingly activated by means of the manual shifting device. The gear shift pattern achieved thus corresponds to that of a usual six-gear transmission. But it is disadvantageous in this transmission structure that separate pneumatic shifting devices have to be provided to make shifting the transmission gears possible in the way customary in a usual H gear shift pattern.

From DE 30 00 577 is, in addition, known a shifting device for motor vehicle transmissions in which a hand shift lever is connected in an HH shift pattern. Two shift fingers are located upon the selector shaft of the transmission; only one finger shifting the four gears of the main transmission. When changing from the second to the third shifting gate, a shift valve is actuated which shifts the range change group. When shifting to the third and fourth gate, the second shift finger is then in gear. The separate actuation system of the range change group of the transmission is also disadvantageous here.

DE 35 27 390 A1 shows, in addition, a manually shiftable double-clutch transmission in which, when actuating the gear change lever in one shifting gate, one of the two clutches of the double clutch is closed. A disadvantage in this shifting device is the limitation to only four gears when the shifting has to be purely manual without outside force assistance.

Finally, in the still not published DE 102 31 547 A1 is described a shifting device for a transmission in which at least one shifting set is associated with two not consecutive ratio steps of the transmission. The shifting device is equipped with one mechanical conversion device by means of a hand shifting device with one H shifting gate which can shift such a transmission.

Figure 2:
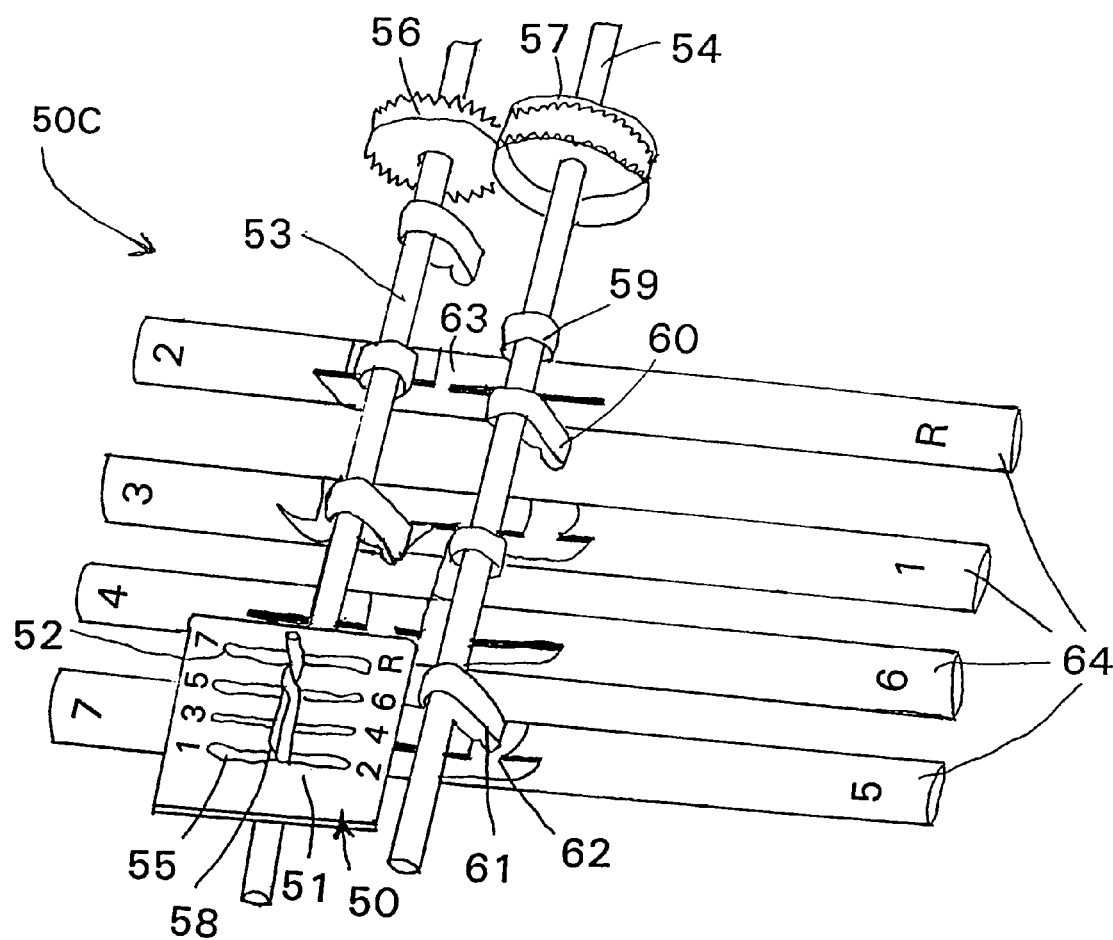

In the shifting device 50 shown in FIG. 2, a transmission shift lever 52 is led into the HH shifting gate 51 and is coupled with two transmission selector shafts 53, 54 so that a movement of the shift lever 52 to a shifting gate 55 results in a swiveling of the selector shaft 53 around its longitudinal axis. In addition, a first gear wheel 56 is fastened on the first selector shaft 53 which meshes with a second gear wheel 57 upon the second selector shaft 54. During a revolution of the first selector shaft 53, the second selector shaft 54 rotates, therefore, in the opposite direction. During selection of a shifting gate by the transmission selector lever 52 in a selector gate 58, the two selector shafts 53, 54, compulsorily coupled, are moved parallel with their longitudinal axis.

The two selector shafts 53, 54, in addition, have at their disposal shift fingers 59, 60, 61 which, depending on the transmission gear introduced, engage in depressions 62, 63 individual for each gear of selector bars 64 connected with shift forks. Those shift forks are for their part connected with sliding sleeves of the shifting sets which, during shifting actuation, are axially moved for non-rotatable connection of idler gears with their transmission shaft.

With this background, the problem on which the invention is based is to introduce a selector transmission with six forward and one reverse gear, which has the shortest possible construction and, therefore, can be used for front crosswise installation in a motor vehicle, is shiftable manually or by servo-actuation and, in which for carrying out overlapping gear shifts, two gears disposed in one shifting gate of an H or multi-H shifting gate can each be shifted in the transmission by two different shifting sets.

The solution of this problem results from the features of the main claim while advantageous developments and improvements of the invention can be understood from the sub-claims.

The inventive transmission in which two transmission shifting positions each disposed in one shifting gate of an H or multi-H transmission shifting gate can be shifted in the transmission by means of two different shifting sets is accordingly characterized in that it has one transmission input shaft fixed gears available, are located which, pointing away from the clutch, are lined up in the gear sequence second gear G2 and reverse gear RG, fourth gear G4 and sixth gear G6, third gear G3, first gear G1 and fifth gear G5, that one first and one second countershaft are dispose paraxially with the transmission input shaft, that upon the first countershaft, pointing away from the clutch and consecutively lined up, idler gears are supported for the second gear G2, the fourth gear G4, the third gear G3 and for the first gear G1, that upon the second countershaft idler gears pointing away from the clutch are consecutively supported for the reverse gear RG, the sixth gear G2 and the fourth gear G4 a first shifting set, between the idler gears for the third gear G3 and the first gear G1 a second shifting set and between the idler gears for the third gear G3 and the first gear G1 a second shifting set and between the idler gears for the reverse gear RG and the sixth gear G6 and a third shifting set are situated, that for coupling the idler gear for the fifth gear G5 with the second countershaft a fourth shifting set is provided, that the fixed gear for driving the idler gear for the reverse gear RG meshes with a fixed gear upon a reverse gear shaft, that on the reverse gear shaft one other fixed gear is situated which drives the reverse gear idler gear on the second countershaft and that upon the two countershafts fixed wheels are fastened which mesh with an output fixed gear upon a transmission output shaft.

In an advantageous embodiment of the invention in this transmission, associated with each shifting set, are one sliding sleeve axially movable upon the respective transmission shaft but non-rotatably connected therewith, the same as synchronizer rings situated to the right and/or left thereof.

It can be further provided that the end of the transmission output shaft pointing to a differential or transfer transmission, is aligned essentially in direction to the starting and separating clutch. It is also deemed advantageous in this connection that the output gears of both countershafts be located on the end of said shafts which points essentially in direction to a single starting and separating clutch.

For actuating the sliding sleeves, in addition, these are connected with a setting device actuated manually or servo-assisted. Insofar as the inventive transmission is designed as automated selector transmission, the setting devices actuatable with servo-assistance are designed as piston-cylinder systems operated by means of a hydraulic or pneumatic pressure medium. The piston-cylinder systems receive their actuation commands here from a control and regulation device which reacts to actuation signals of sensors in the area of the H or multi-H shifting gate.

The setting device actuated manually or servo-assisted is further equipped with a mechanical conversion device (FIG. 2) which converts a shift lever movement in a shifting gate of an H multi-H shifting gate from one gear position to the next gear position G1–G2; G3–G4; G5–G6 into actuation movements for two shifting sets in the transmission.

A description of a drawing is accompanied for better understanding of the structure of the inventive transmission and of its interaction with a previously applied for but not pre-published mechanical conversion device for an H shifting device. In the drawing:

FIG. 1 shows a diagrammatic representation of a six-gear selector transmission; and FIG. 2 shows a perspective representation of a conversion device for an HH shifting device.

As illustrated in FIG. 1, an inventive six-gear selector transmission 1 is driven by a prime mover designed here as an internal combustion engine 2 which connects a crankshaft 3 with the input side of a starting and separating clutch 4. The output side of said clutch 4 non-rotatably communicates with an input shaft 5 of the transmission 1 upon which a total of five gear wheels (fixed gears) 6, 7, 8, 9, 10 are non-rotatably situated. Said fixed gears 6, 7, 8, 9, 10 drive gear wheels (idler gears) 11, 12, 13, 14, 18, 19 for the six forward gears supported in a transmission housing (not shown here) upon two countershafts 15, 16 paraxially aligned relative to the transmission input shaft 5.

The gear wheels 6, 11 form the ratio step for a second transmission gear G2; the gear wheels 7, 12 for a fourth gear G4; the gear wheels 8, 13 for a third gear G3; the gear wheels 9, 14 for a first gear G1; the gear wheels 7, 18 for a sixth gear and the gear wheels 10, 19 for a fifth gear. In this way, departing from the input side (clutch 4) of the transmission, there results the gear sequence G2, and RG; G4 and G6; G3, G1 and G5. An axially very compact structure is achieved here by virtue of the double utilization of the fixed gear 7 for driving the gear wheels 12, 18 for the fourth gear G4 and the sixth gear G6.

FIG. 1 further shows that the fixed gear 9 for driving the gear wheels of the reverse gear RG also meshes with a fixed gear 21 upon a reverse gear shaft 22 which is disposed in the transmission offset against the input shaft 5 and the countershaft 16 so that the fixed gear 9 can flatly remain in tooth contact with said reverse gear fixed gear 21. This connection is indicated by a dotted toothing line 20.

Upon said reverse gear shaft 22 is, in addition, situated one other fixed gear 23 which, for its part, meshes upon the countershaft 16 with the reverse idler gear 17.

To connect said idler gears with the respective countershafts 15, 16, coupling devices 29, 30, 31 axially movable, but non-rotatably connect with said shafts 15, 16 are situated between the idler gears 11, 12; 13, 14 and 17, 18. Said coupling devices consist of sliding gears and synchronizer rings by means of which, during a concrete shifting operation, the rotational speed of the idler gears can be adapted, as known per se, to the respective rotational speed of the countershaft and the inherent non-rotatnable connection can be produced between the respective gear wheel and the shaft.

Upon one countershaft 16 is, in addition, located a coupling device 32 with which the idler gear 19 of the fifth gear G5 can be connected with the countershaft 16.

The output of the countershafts 15, 16 results via fixed gears 24, 26 which are fastened upon said countershafts. At the same time, the fixed gear 26 of the countershaft 16 meshes directly with an output fixed gear 27 upon a transmission output shaft 28, shown here axially offset, while the fixed gear 24 upon the other countershaft 15 is also directly in tooth contact via its output toothing 25 with said output gear wheel 27 upon the transmission output shaft 28.

As can be understood from FIG. 1, the coupling devices 29, 30, 31 are situated, respectively, between two transmission gears G2, G4; G3, G1 and RG, G6 which, in an H or multi-H shifting gate, do not form consecutive transmission gears in a common shifting gate. Thereby the customary shift actuation devices with which the coupling devices 29, 30, 31, 32 are axially moved upon the countershafts 15, 16 cannot be easily used for this transmission 1. Therefore, for such a six-gear transmission, a mechanical conversion device, shown by way of example in FIG. 2 and already described in detail above, is advantageously used.

REFERENCE NUMERALS 1 selector transmission
2 internal combustion engine
3 crankshaft
4 starting and separating clutch
5 transmission input shaft
6 fixed gear
7 fixed gear
8 fixed gear
9 fixed gear
10 fixed gear
11 idler gear
12 idler gear
13 idler gear
14 idler gear
15 first countershaft
16 second countershaft
17 idler gear
18 idler gear
19 idler gear
20 reverse gear input toothing
21 fixed gear
22 reverse shaft
23 fixed gear
24 fixed gear
25 output toothing
26 fixed gear
27 fixed gear
28 transmission output shaft 29 coupling device
30 coupling device
31 coupling device
32 coupling device
50 transmission shift device
51 shifting gate
52 shift lever
53 first shift shaft
54 second shift shaft
55 shifting gate
56 gear wheel
57 gear wheel
58 selector gate
59 shift finger
60 shift finger
61 shift finger
62 recess
63 recess
64 selector bar

What is claimed is:

1. A selector transmission (1) for a motor vehicle in which two transmission shift positions located in a shifting gate (55) of a H or a multi-H transmission device (50) can respectively be shifted, the transmission comprising:
    a single transmission input shaft (5);
    a plurality of fixed transmission input gears (6, 7, 8, 9, 10) situated on the transmission input shaft (5) and arranged in an input gear sequence of a first transmission input gear (6) for driving a second transmission gear (G2) ratio and a transmission reverse gear (RG), a second transmission input gear (7) for driving a fourth transmission gear (G4) ratio and a sixth transmission gear (G6) ratio, a third transmission input gear (8) for driving a third transmission gear (G3) ratio, a fourth transmission input gear (9) for driving a first transmission gear (G1) ratio and a fifth transmission input gear (10) for driving a fifth transmission gear (G5) ratio;
    a first countershaft (15) parallel with the transmission input shaft (5) and including
        a first plurality of idler gears (11, 12, 13, 14) rotatably mounted upon the first countershaft (15) in a second gear sequence of a first idler gear (11) engaged with the first transmission input gear (6) for the second transmission gear (G2) ratio, a second idler gear (12) engaged with the second transmission input gear (7) for the fourth transmission gear (G4) ratio, a third idler gear (13) engaged with the third transmission input gear (8) for the third transmission gear (G3) ratio and a fourth idler gear (14) engaged with the fourth transmission input gear (9) for the first transmission gear (G1) ratio; and
        a first coupling device (29) for selectably coupling one of the first idler gear (11) and the second idler gear (12) with the first countershaft (15) and a second coupling device (30) for selectably coupling one of the third idler gear (13) and the fourth idler gear (14) with the first countershaft (15);
    a reverse gear shaft (22) including
        a first reverse gear (21) fixed on the reverse gear shaft (22) and engaged with the fourth transmission input gear (9) and a second reverse gear (23);
    a second countershaft (16) including
        a second plurality of idler gears (17, 18, 19) rotatably mounted on the second countershaft (16) in a third gear sequence of a fifth idler gear (17) engaged with the second reverse gear (23), a sixth idler gear (18) engaged with the second transmission input gear (7) for the sixth transmission gear (G6) ratio, and a seventh idler gear (19) engaged with the a fifth transmission input gear (10) for the fifth transmission gear (G5) ratio; and
        a third coupling device (31) for selectively coupling one of the fifth idler gear (17) and the sixth idler gear (18) with the second countershaft (15) and a fourth coupling device (32) for selectively coupling the seventh idler gear (19) with the second counter shaft (16); and
    a transmission output shaft (28) having a transmission output gear (27) engaged with a first output gear (24) fixed on the first countershaft (15) and with a second output gear (26) fixed on the second countershaft (16), whereby
the second transmission input gear (7) engages the second idler gear (12) and the sixth idler gear (18) to generate both the fourth transmission gear (G4) ratio and the sixth transmission (G6) gear ratio, and
a first transmission gear pair (6, 11; 7, 12) for the second and fourth transmission gear (G2, G4) ratios, a second transmission gear pair (8, 13; 9, 14) for the third and first transmission gear (G3, G1) ratios and a third transmission gear pair (23, 17; 7, 18) for the reverse and sixth transmission gear (RG, G6) ratios are non-consecutive gears with respect to a common shifting gate (55), whereby the transmission (1) further includes
    a mechanical conversion device (500) which converts a shift lever (52) movement in a shifting gate (51) of an H or multi-H shifting gate (55) from one gear position to a next gear position (G1–G2; G3–G4; G5–G6) into actuation movements for two of the first, second, third, and fourth coupling devices (29, 30, 31, 32).

2. The selector transmission according to claim 1, wherein each one of said first, second, third, and fourth coupling devices (29, 30, 31, 32) comprises sliding sleeves axially movable upon the respective first and second countershafts (15, 16) but non-rotatably connected therewith and synchronizer rings situated to the right and left thereof.

3. The selector transmission according to claim 1, wherein the transmission output shaft (28) is disposed essentially in an area of said starting and separating clutch (4).

* * * * *